(12) United States Patent
Grantz

(10) Patent No.: US 8,480,114 B1
(45) Date of Patent: Jul. 9, 2013

(54) STROLLER WITH FOLD OUT CHANGING TABLE

(76) Inventor: Robin Grantz, North Apollo, PA (US)

(*) Notice: Subject to any disclaimer, the term of this patent is extended or adjusted under 35 U.S.C. 154(b) by 131 days.

(21) Appl. No.: 13/114,068

(22) Filed: May 24, 2011

(51) Int. Cl.
  *B62B 7/00* (2006.01)
  *A47D 13/00* (2006.01)
(52) U.S. Cl.
  USPC .............. 280/642; 280/657; 280/648; 5/655
(58) Field of Classification Search
  USPC ................ 5/655; 280/47.38, 642, 657, 30, 280/643, 648, 649, 655.1; 297/183.4, 183.6, 297/144, 146
  See application file for complete search history.

(56) References Cited

U.S. PATENT DOCUMENTS

| | | |
|---|---|---|
| D310,645 S | 9/1990 | Julien |
| 5,234,224 A | 8/1993 | Kim |
| 5,375,869 A | 12/1994 | Hsiao |
| 6,389,624 B1 | 5/2002 | Madole |
| 7,347,442 B1 | 3/2008 | Carter |
| 2007/0170674 A1 | 7/2007 | Chuah et al. |
| 2009/0178203 A1 | 7/2009 | Homan |
| 2011/0232000 A1* | 9/2011 | Rodriguez et al. ............ 5/655 |

* cited by examiner

*Primary Examiner* — Robert G Santos
*Assistant Examiner* — Brittany Wilson
(74) *Attorney, Agent, or Firm* — Kyle Fletcher (57) ABSTRACT

The stroller with fold out changing table that is installed onto an existing baby stroller or is integrated into the design of the baby stroller. The fold out changing table extends horizontally atop the baby seat of the stroller to provide a horizontal surface that is at least waist-high for an adult to easily change a baby's diaper. The fold out changing table can fold down to a retracted state when not in use. The fold out changing table features a security belt to secure an infant thereon as well as telescoping legs that stabilize an end of the fold out changing table atop the baby seat.

9 Claims, 7 Drawing Sheets

STROLLER WITH FOLD OUT CHANGING TABLE

CROSS REFERENCES TO RELATED APPLICATIONS

Not Applicable.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of baby strollers, more specifically, a baby stroller with a fold out changing table that extends out from said baby stroller.

B. Discussion of the Prior Art

As will be discussed immediately below, no prior art discloses a fold out changing table that extends atop a baby stroller; wherein the fold out changing table is either integrated into the design of the baby stroller or is an after-market accessory that attaches to certain styled baby stroller; wherein the fold out changing table is composed of two hingedly engaged changing surfaces that fold out horizontally via a locking hinge; wherein one changing surface includes telescoping legs that extend and retract to engage upon sides of the baby stroller whereas a second changing surface attaches to either side of the baby stroller handle.

The Chuah et al. Patent Application Publication (U.S. Pub. No. 2007/0170674) discloses a diaper changing station in connection with a stroller. However, the changing station extends horizontally from under the seat as opposed to a changing table that extends above the baby seat to provide user access at least at waist height.

The Homan Patent Application Publication (.U.S. Pub. No. 2009/0178203) discloses a changing table that is secured to most baby carriages. Again, the changing table extends from behind the stroller and is not a foldable structure that extends and folds flat above the baby seat to provide an elevation most suitable for use with an adult.

The Kim Patent (U.S. Pat. No. 5,234,224) discloses a multi-function baby support and transport device with a folding diaper changing table attached to its handle. However, the folding diaper changing table does not fold out flat above the baby seat and use telescoping arms.

The Madole Patent (U.S. Pat. No. 6,389,624) discloses a portable child changing apparatus that serves as a changing table. However, the apparatus is not for use with a baby stroller.

The Hsiao Patent (U.S. Pat. No. 5,375,869) discloses a structure for a versatile baby stroller which can be clamped onto a table. However, the stroller can be clamped to a stationary table, and not a changing table that folds out above the baby seat of the stroller to provide a portable changing surface.

The Carter Patent (U.S. Pat. No. 7,347,442) discloses a stroller with a portable table. However, the portable table extends from behind the stroller and is not a foldable structure that extends and folds flat above the baby seat to provide an elevation most suitable for use with an adult.

While the above-described devices fulfill their respective and particular objects and requirements, they do not describe a fold out changing table that extends atop a baby stroller; wherein the fold out changing table is either integrated into the design of the baby stroller or is an after-market accessory that attaches to certain styled baby stroller; wherein the fold out changing table is composed of two hingedly engaged changing surfaces that fold out horizontally via a locking hinge; wherein one changing surface includes telescoping legs that extend and retract to engage upon sides of the baby stroller whereas a second changing surface attaches to either side of the baby stroller handle. In this regard, the stroller with fold out changing table departs from the conventional concepts and designs of the prior art.

SUMMARY OF THE INVENTION

The stroller with fold out changing table that is installed onto an existing baby stroller or is integrated into the design of the baby stroller. The fold out changing table extends horizontally atop the baby seat of the stroller to provide a horizontal surface that is at least waist-high for an adult to easily change a baby's diaper. The fold out changing table can fold down to a retracted state when not in use. The fold out changing table features a security belt to secure an infant thereon as well as telescoping legs that stabilize an end of the fold out changing table atop the baby seat.

An object of the invention is to provide a fold out changing table that extends over the baby seat to provide a changing platform that is at or near waist level of the adult changing the diaper.

A further object of the invention is to provide a fold out changing table that can easily fold flat in a horizontal position or fold down to a retracted state for storage between uses.

A further object of the invention is to provide a fold out changing table that includes a locking hinge to secure the fold out table in a flat position for use.

A further object of the invention is to provide a fold out changing table that can be either a permanent fixture of the baby stroller or an after-market product that fits onto existing baby strollers.

A further object of the invention is to provide a fold out changing table that includes telescoping legs that provide for a secure and level fold out changing table.

A further object of the invention is to provide fold out changing table that includes a pillow and security belt to comfort and secure the infant during use with the fold out changing table.

These together with additional objects, features and advantages of the stroller with fold out changing table will be readily apparent to those of ordinary skill in the art upon reading the following detailed description of presently preferred, but nonetheless illustrative, embodiments of the stroller with fold out changing table when taken in conjunction with the accompanying drawings.

In this respect, before explaining the current embodiments of the stroller with fold out changing table in detail, it is to be understood that the stroller with fold out changing table is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stroller with fold out changing table.

It is therefore important that the claims be regarded as including such equivalent construction insofar as they do not depart from the spirit and scope of the stroller with fold out changing table. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A stroller with fold out changing table 100 (hereinafter invention) includes a first member 101, a second member 102, a locking hinge 103, and telescoping legs 104.

The first member 101 is connected to the second member 102 via the locking hinge 103. It shall be noted that the locking hinge 103 insures 180 degrees of movement between the first member 101 and the second member 102. More importantly, the locking hinge 103 insures that the first member 101 folds over and faces the second member 102. The locking hinge 103 can lock the first member 101 and the second member 102 to a flat state (see FIGS. 1, 2, 5, and 6). Upon locking the locking hinge 103, the first member 101 and the second member 102 shall be rigidly aligned in a flattened state until the locking hinge 103 is unlocked after which the first member 101 and the second member 102 shall fold to a folded state (see FIG. 3).

Figure 3:
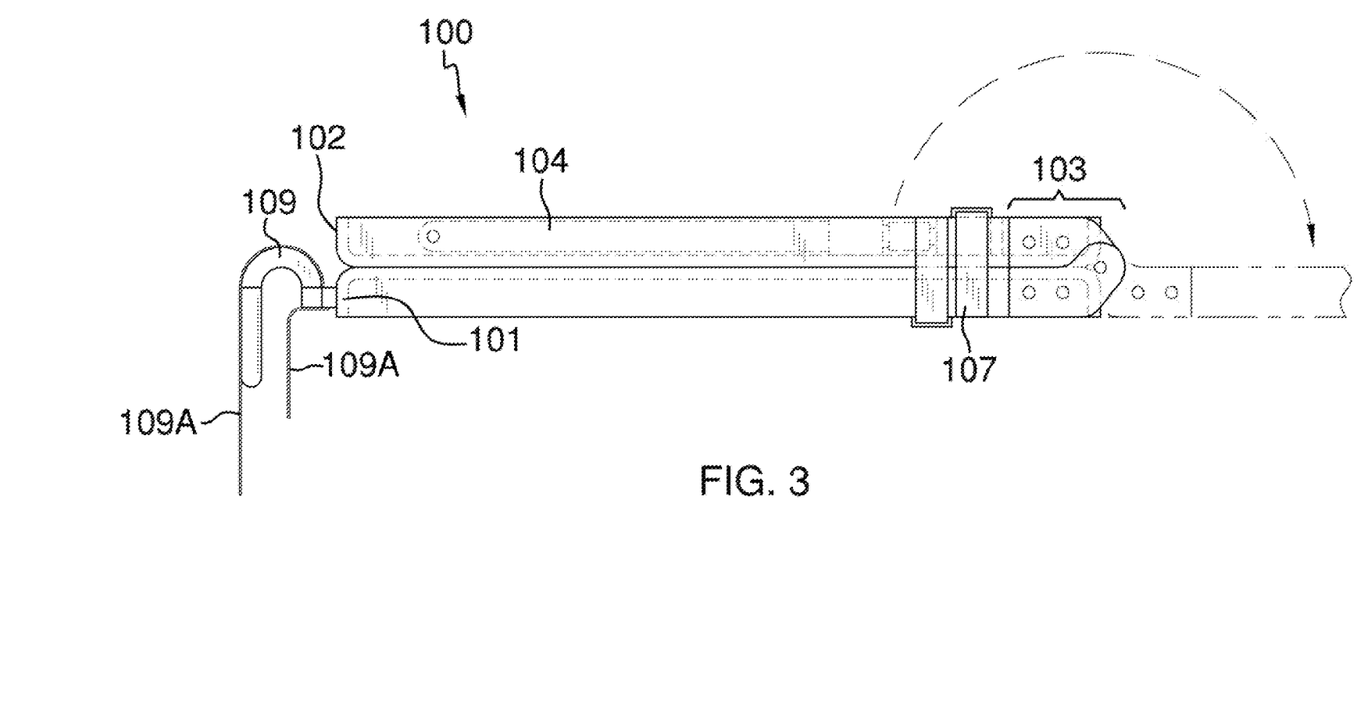
FIG. 3 illustrates a side view of the fold out changing table in a retracted state with an arrow indicating rotation of and extension of the fold out changing table.

It shall be noted that the first member 101 and the second member 102 are made of thin construction and have lips that fold around each end to provide structural integrity (note that broken lines in FIG. 3).

Adorning a top surface of both the first member 101 and the second member 102 is a pad 106, which simply provides padding to an infant that is laid upon the invention 100. It shall be noted that when both the first member 101 and the second member 102 are folded to a flattened state as in FIGS. 1, 2, 5, and 6, the first member 101 and the second member 102 form a changing table.

Attached to the second member 102 are the telescoping legs 104. The telescoping legs 104 attach on either side of the second member 102. The telescoping legs 104 extend down from below the second member 102, and attach onto a baby stroller 130. The telescoping legs 104 attach to the second member 102 opposite of the locking hinge 103. The telescoping legs 104 can fold up to a retracted state when not in use or extend to attach to the baby stroller 130 (see FIGS. 1, 4, 5, and 6).

Figure 1:
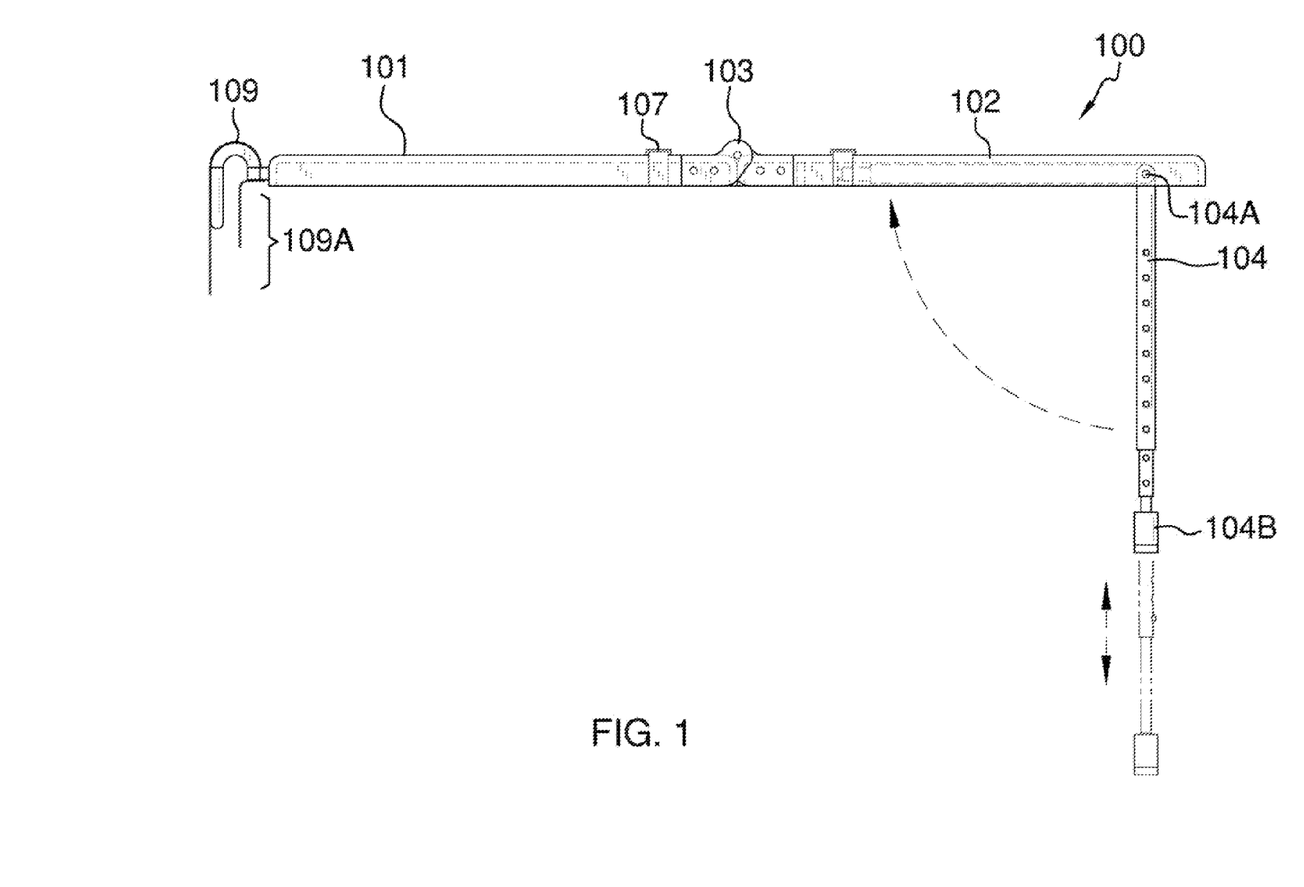
FIG. 1 illustrates a side view of the fold out changing table of the baby stroller with arrows indicating rotation of the telescoping legs as well as extension and retraction of the telescoping legs.
Figure 2:
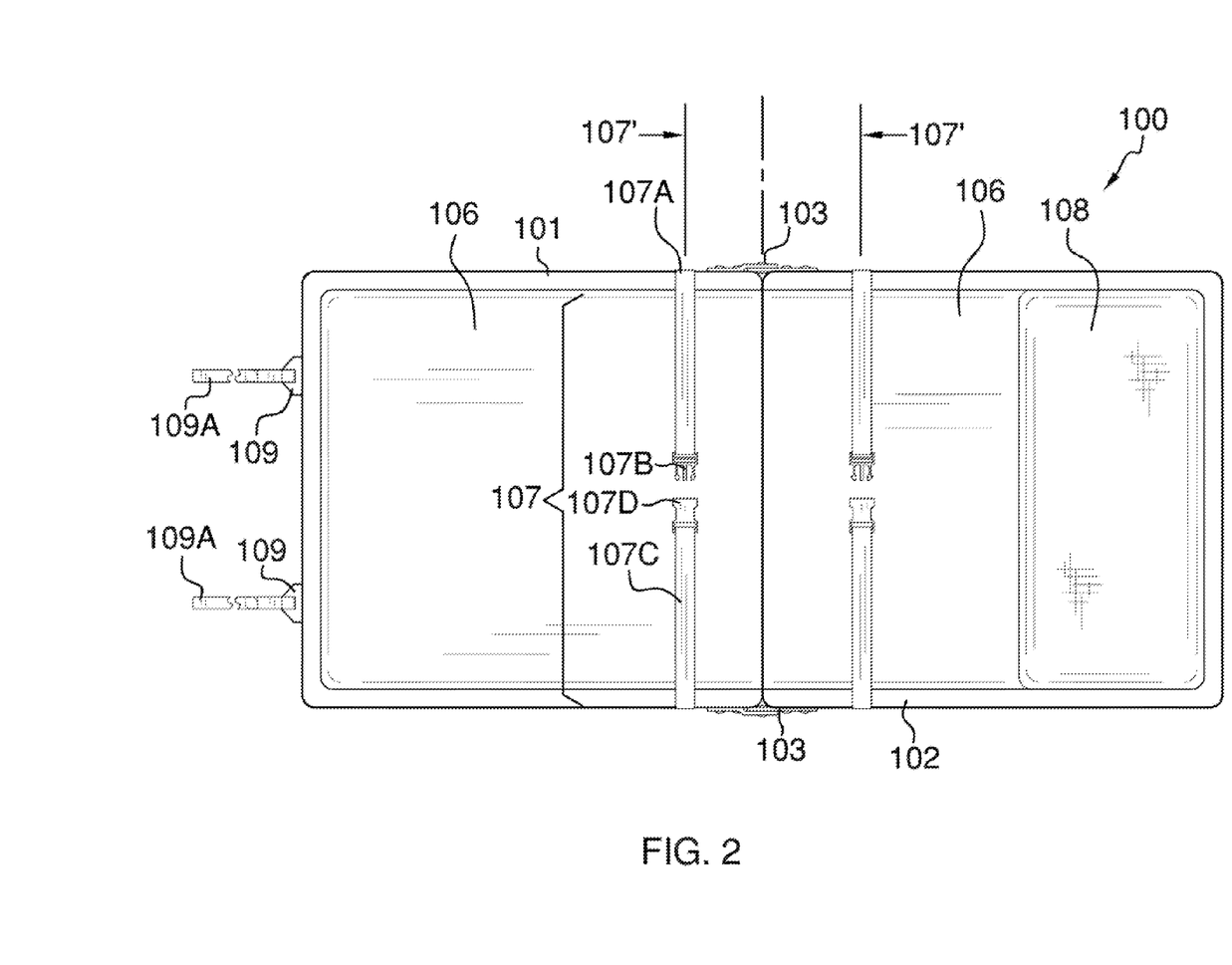
FIG. 2 illustrates a top view of the changing table fully extended and depicting the security belts and pillow.

When in a retracted state, the telescoping legs 104 can rotate to a flattened state against a bottom surface of the second member 102 (see FIGS. 1 and 3). The telescoping legs 104 attach to the second member 102 via a pivot point 104A.

The telescoping legs 104 are each composed of a plurality of hollow tubes of progressively smaller internal diameters that fit within one another consecutively and of which lock together via spring-loaded buttons that slide into one of a plurality of holes that are equally spaced along the length of the telescoping legs 104, and which are well known in the art. Located at a bottom-most section of the telescoping leg 104 is a bracket 104B, which is used to secure the telescoping leg 104 to the baby stroller 130. The bracket 104B is simply a curved piece that clips onto an exterior surface of a tubed-portion of the baby stroller 130. It shall be noted that the brackets 104B attach at different locations on the baby stroller 130 when comparing FIGS. 5 and 6.

Figure 4:
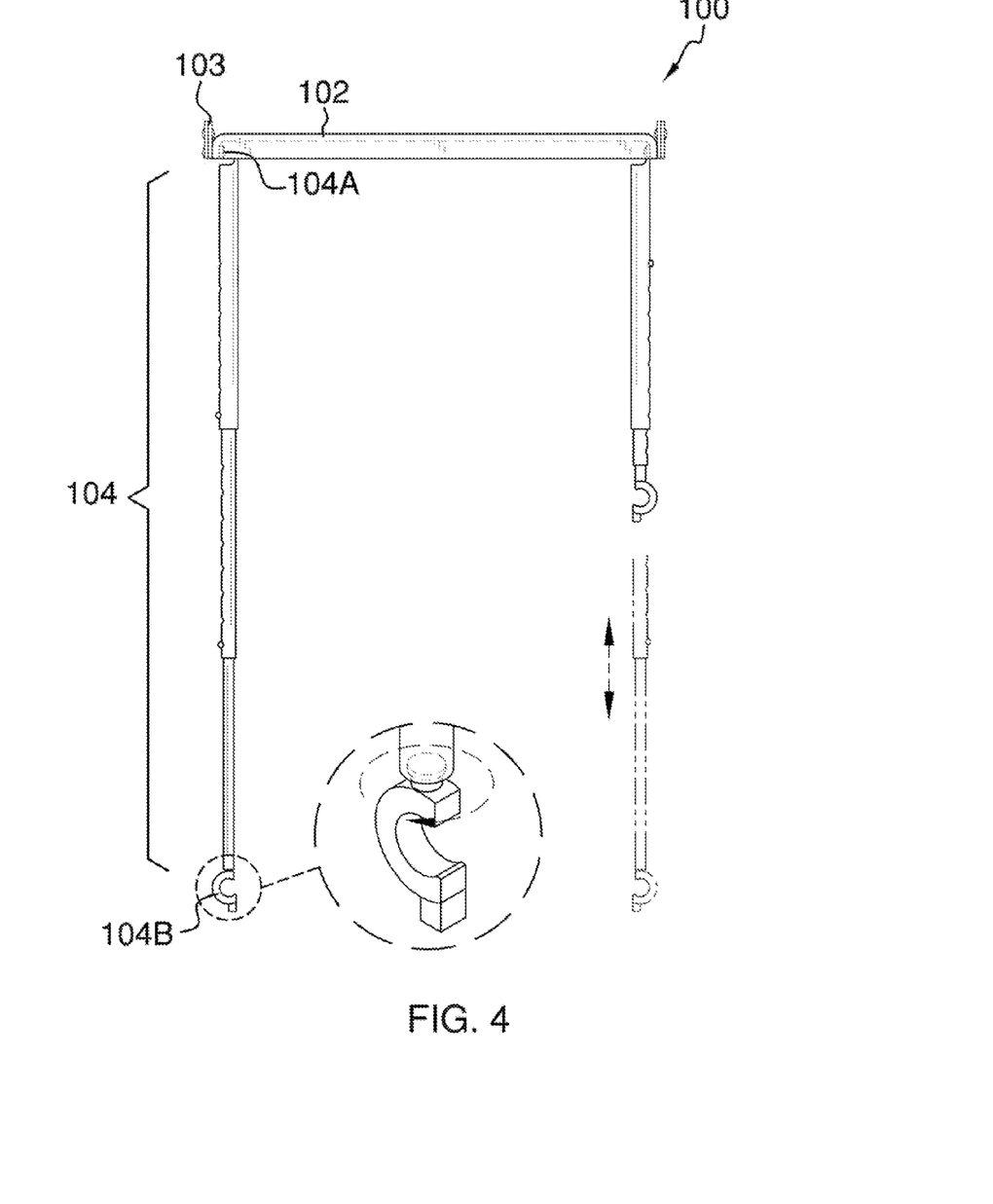
FIG. 4 illustrates a front view of the folding changing platform with the telescoping legs extended and detailing the bracket that secures the telescoping leg to the stroller, and further detailing the rotation of the bracket about a bottom of the telescoping leg.

Referring to FIG. 4, the bracket 104B is located on each telescoping leg 104, and is able to rotate 360 degrees about the bottom of the telescoping leg 104. It shall be noted that the ability of the bracket 104B to rotate is important, in that it provides flexibility to the invention 100 in order to attach to differently-shaped strollers.

Located on the first member 101 and on the second member 102 are security belts 107. Each security belt 107 is comprised of a first strap 107A having a male buckle 107B and a second strap 107C having a female buckle 107D. The male buckle 107B clips into the female buckle 107D to secure an infant atop the changing table. It shall be noted that the security belts 107 are separated at a distance 107', which may not be equally distanced from one another with respect to the hinges 103, which is on purpose in that unequally distanced security belts 107 provide clearance from one another when the invention 100 is folded up when not in use. Located on the second member 102 is a pillow 108.

Extending from the first member 101 is a pair of hooks 109, which are opposite the locking hinge 103. The hooks 103 are responsible for securing the first member 101 to a handle 131 of the baby stroller 130. The hooks 109 include securing means 109A thereon, which comprise nylon hook and loop strips that further secure the first member 101 to the handle 131 of the baby stroller 130. It shall be noted that the hooks 109 and securing means 109A are ideally suited for use of the invention 100 as an after-market product that can be attached onto an existing baby stroller 130 (see FIGS. 1, 3, and 6).

It shall be further noted that the hooks 109 may be inserted into a cup holder 132 that is located at the handle 131 of the baby stroller 130. The insertion of the hooks 109 into the cup holders 132 is a means of providing further stability to that portion of the invention 100.

Figure 5:
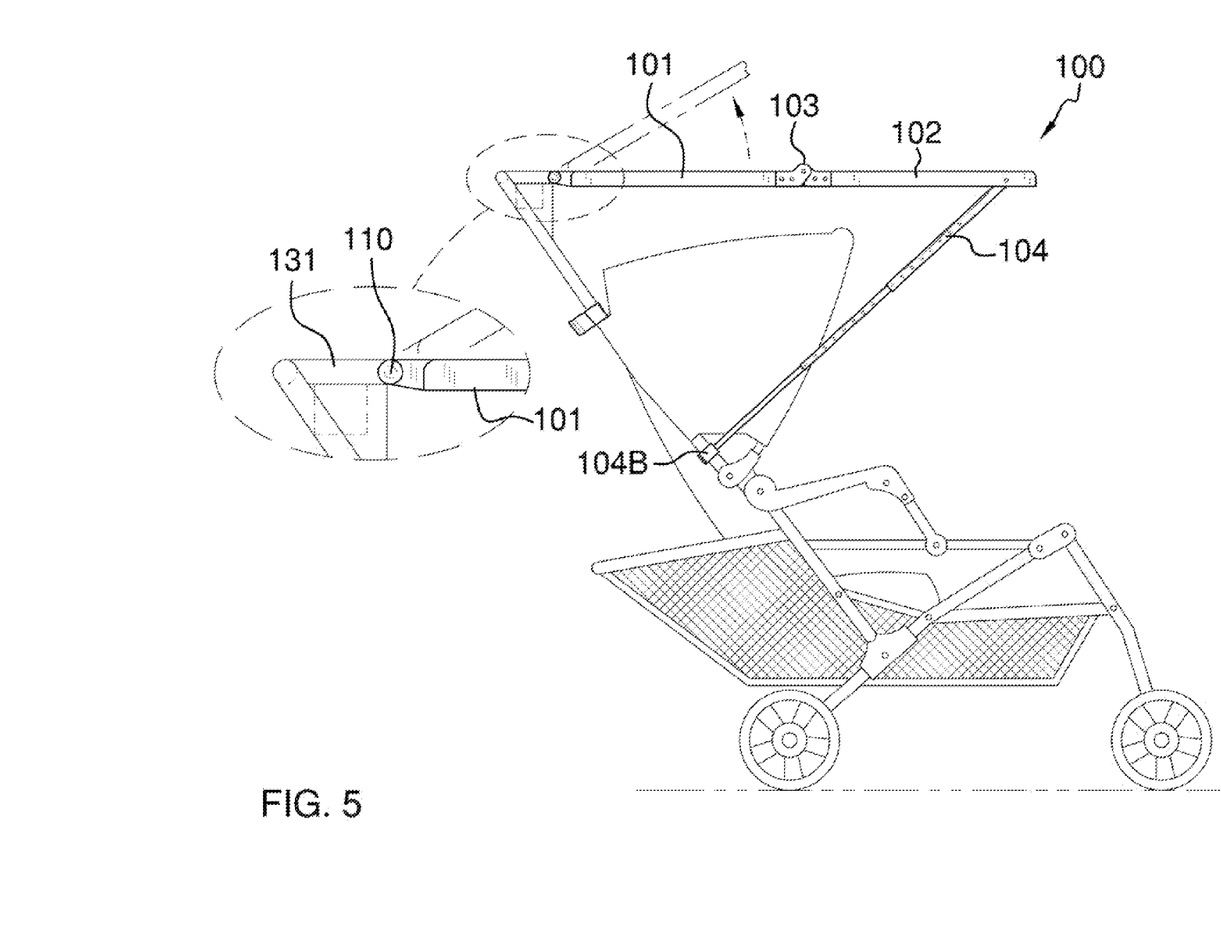
FIG. 5 illustrates a side view of the stroller with fold out changing table permanently attached atop the baby stroller with a cut-away detail of the fixed hinge to the stroller handle.

Referring to FIG. 5, the invention 100 does not employ the use of hooks 109, but rather simply secures that end of the first member 101 directly to the handle 131 of the baby stroller 130. More particularly, the first member 101 is directly secured to the handle 131 such that the first member 101 is not separable from the baby stroller 130. However, the first member 101 may rotate about the handle 131 as a fixed hinge 110, which is illustrated by the rotational arrow in FIG. 5 depicting rotation of the first member 101.

Figure 5A:
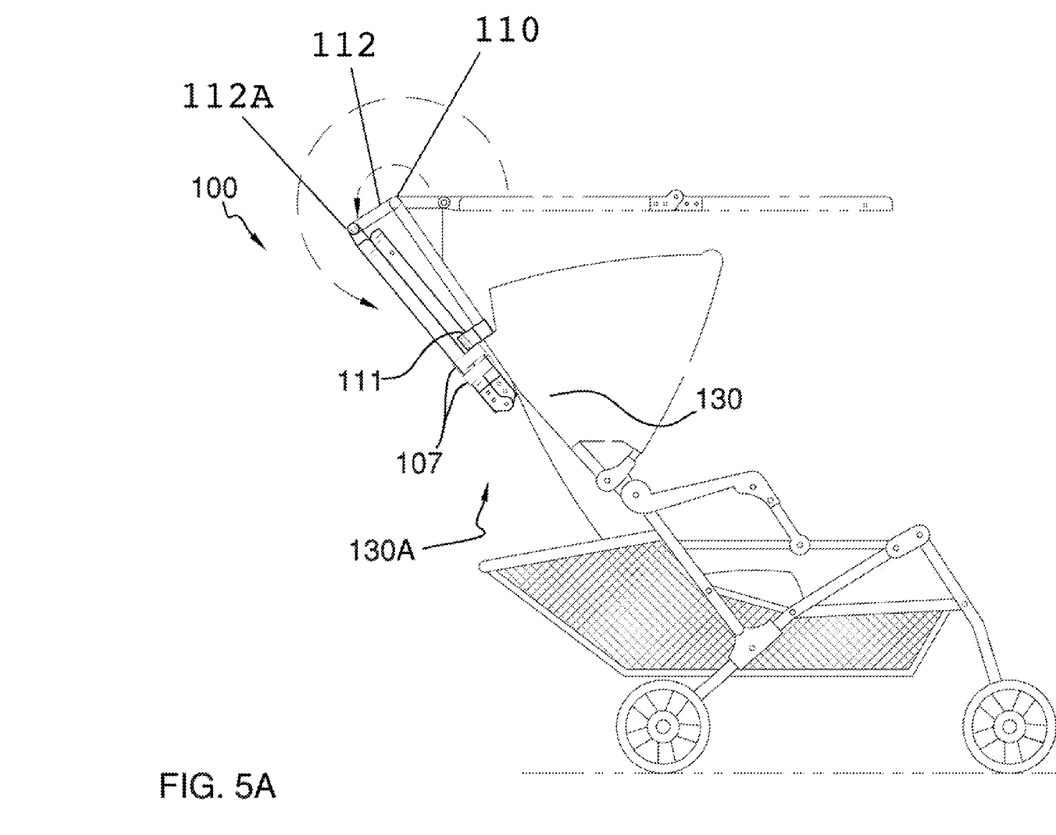
FIG. 5A illustrates a side view of the stroller with fold out changing table being rotated and secured to a rear side of the baby stroller.
Figure 6:
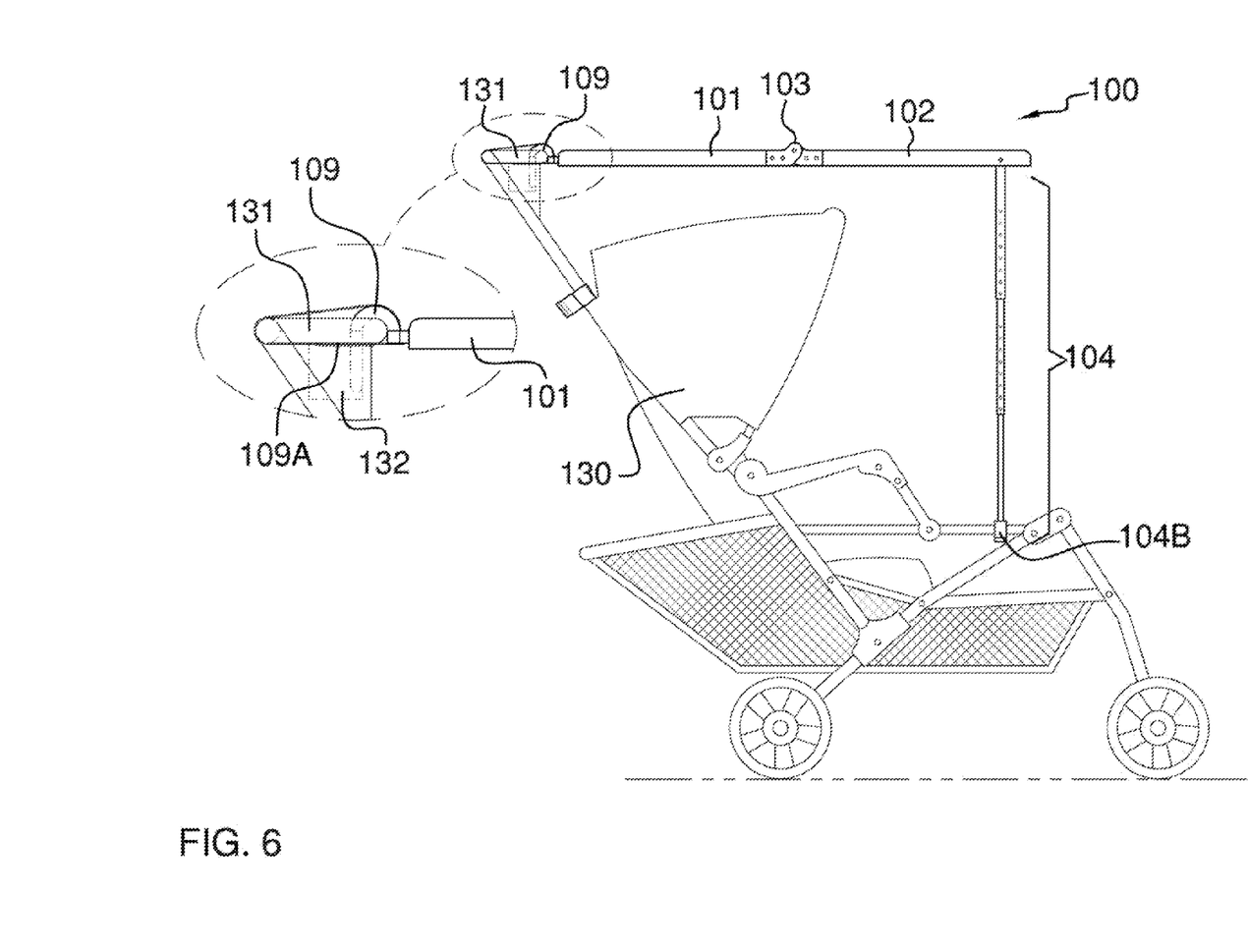
FIG. 6 illustrates a side view of the stroller with fold out changing table as an accessory that temporarily attaches atop the baby stroller and with a cut-away detail of the Velcro strap around a stroller handle.

Referring to FIGS. 5 and 5A, the invention 100 includes clips 111 that are mounted on the stroller 130, which enable the invention 100 to rotate around the handle 131, and lock in behind the stroller 130 when not in use.

In referring to FIG. 5A, it shall be noted that the invention 100 must be folded up prior to rotation and securement to the clips 111. The clips 111 simply keep the invention 100 out of the way when not in use, but still attached to the stroller 130 irregardless of whether the invention 100 is permanently affixed to the stroller 130 or not. It shall be noted that the placement of the clips 111 is important in that the clips 111 shall be located on a rear side 130A of the baby stroller 130 such that upon rotation of the invention 100, the clips are close so that the invention 100 can be secured thereon. It shall be further noted that the clips may secure the invention 100 at an angle or vertical depending upon the interplay of geometry of the baby stroller 130.

It shall be noted that a third member 112 may be used, and positioned between the handle 131 and the first member 101. The third member 112 provides a second hinge 112A, which enables the first member 101 to rotate around and provide clearance for both the first member 101 and the second member 102 when folded behind the stroller 130A as in FIG. 5A.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A stroller with fold out changing table comprising:
a first member connected to a locking hinge that is connected to a second member;
telescoping legs extend down from the second member and attach to a baby stroller;
the first member attaches to a handle of a baby stroller;
wherein the first member and second member fold flat to form a changing table that is positioned above a baby seat of said baby stroller;
whereupon detachment of the telescoping legs and folding up of the first member and the second member to a retracted state, the changing table is able to rotate about the handle of the baby stroller in order to secure itself to the baby stroller when not in use;
wherein the telescoping legs can rotate to a flattened state against a bottom surface of the second member; wherein the telescoping legs attach to the second member via a pivot point;
wherein the telescoping legs are each composed of a plurality of hollow tubes of progressively smaller internal diameters that fit within one another consecutively and of which lock together via spring-loaded buttons that slide into one of a plurality of holes that are equally spaced along the length of the telescoping leg; wherein located at a bottom-most section of the telescoping leg is a bracket, which is used to secure the telescoping leg to the baby stroller; wherein the bracket is a curved piece that clips onto an exterior surface of a tubed-portion of the baby stroller; wherein the bracket can rotate 360 degrees about the telescoping leg;
wherein located on the first member and the second member is a security belt comprised of a first strap having a male buckle and a second strap having a female buckle; wherein the male buckle clips into the female buckle to secure an infant atop the changing table; wherein located on the second member is a pillow;
wherein extending from the first member is a pair of hooks, which are opposite the locking hinge; wherein the hooks secure the first member to a handle of the baby stroller; wherein the hooks include securing means thereon, which comprise nylon hook and loop strips that further secure the first member to the handle of the baby stroller;
wherein the hooks are inserted into a cup holder that is located at the handle of the baby stroller; wherein clips installed on a rear side of the baby stroller enable the changing table to be rotated around the handle of the baby stroller and secured to the rear side of the baby stroller;
wherein the first member attaches to a handle of the baby stroller via a fixed hinge such that the first member may rotate about the handle of the baby stroller; wherein clips installed on a rear side of the baby stroller enable the changing table to be rotated around the handle of the baby stroller and secured to the rear side of the baby stroller.

2. The stroller with fold out changing table as described in claim 1 wherein the locking hinge provides 180 degrees of rotational movement of the first member with respect to the second member.

3. The stroller with fold out changing table as described in claim 2 wherein the locking hinge enables the first member to fold over and face the second member to form the retracted state.

4. The stroller with fold out changing table as described in claim 3 wherein the locking hinge shall lock the first member and the second member to the flattened state to form the changing table.

5. The stroller with fold out changing table as described in claim 1 wherein a pad is affixed to a top surface of both the first member and the second member.

6. The stroller with fold out changing table as described in claim 1 wherein the telescoping legs attach on either side of the second member; wherein the telescoping legs extend down from below the second member; wherein the telescoping legs attach to the second member opposite of the locking hinge; wherein the telescoping legs can fold up to a retracted state when not in use or extend to attach to the baby stroller.

7. A stroller with fold out changing table
- a first member connected to a locking hinge that is connected to a second member;
- telescoping legs extend down from the second member and attach to a baby stroller;
- the first member attaches to a handle of a baby stroller;
- wherein the first member and second member fold flat to form a changing table that is positioned above a baby seat of said baby stroller;
- whereupon detachment of the telescoping legs and folding up of the first member and the second member to a retracted state, the changing table is able to rotate about the handle of the baby stroller in order to secure itself to the baby stroller when not in use;
- wherein the telescoping legs attach on either side of the second member; wherein the telescoping legs extend down from below the second member; wherein the telescoping legs attach to the second member opposite of the locking hinge; wherein the telescoping legs can fold up to a retracted state when not in use or extend to attach to the baby stroller;
- wherein the telescoping legs can rotate to a flattened state against a bottom surface of the second member; wherein the telescoping legs attach to the second member via a pivot point;
- wherein the telescoping legs are each composed of a plurality of hollow tubes of progressively smaller internal diameters that fit within one another consecutively and of which lock together via spring-loaded buttons that slide into one of a plurality of holes that are equally spaced along the length of the telescoping leg; wherein located at a bottom-most section of the telescoping leg is a bracket, which is used to secure the telescoping leg to the baby stroller; wherein the bracket is a curved piece that clips onto an exterior surface of a tubed-portion of the baby stroller; wherein the bracket can rotate 360 degrees about the telescoping leg;
- wherein located on the first member and the second member is a security belt comprised of a first strap having a male buckle and a second strap having a female buckle; wherein the male buckle clips into the female buckle to secure an infant atop the changing table; wherein located on the second member is a pillow;
- wherein extending from the first member is a pair of hooks, which are opposite the locking hinge; wherein the hooks secure the first member to a handle of the baby stroller; wherein the hooks include securing means thereon, which comprise nylon hook and loop strips that further secure the first member to the handle of the baby stroller;
- wherein the hooks are inserted into a cup holder that is located at the handle of the baby stroller; wherein clips installed on a rear side of the baby stroller enable the changing table to be rotated around the handle of the baby stroller and secured to the rear side of the baby stroller;
- wherein the first member attaches to a handle of the baby stroller via a fixed hinge such that the first member may rotate about the handle of the baby stroller; wherein clips installed on a rear side of the baby stroller enable the changing table to be rotated around the handle of the baby stroller and secured to the rear side of the baby stroller.

8. The stroller with fold out changing table as described in claim 7 wherein the locking hinge provides 180 degrees of rotational movement of the first member with respect to the second member; wherein the locking hinge enables the first member to fold over and face the second member to form the retracted state; wherein the locking hinge shall lock the first member and the second member to the flattened state to form the changing table.

9. The stroller with fold out changing table as described in claim 7 wherein a pad is affixed to a top surface of both the first member and the second member.

* * * * *